United States Patent [19]

Yoshimura

[11] Patent Number: 4,751,593
[45] Date of Patent: Jun. 14, 1988

[54] CASSETTE EJECTING DEVICE FOR A TAPE RECORDER OR A LIKE APPARATUS

[75] Inventor: Toshio Yoshimura, Kawasaki, Japan

[73] Assignee: Tanashin Denki Co., Ltd., Tokyo, Japan

[21] Appl. No.: 945,805

[22] Filed: Dec. 24, 1986

[30] Foreign Application Priority Data

Aug. 30, 1986 [JP] Japan .......................... 61-133255[U]

[51] Int. Cl.$^4$ ............................................... G11b 15/66
[52] U.S. Cl. .................................. 360/96.5; 360/96.6
[58] Field of Search .................. 360/96.5, 93, 96.1, 360/96.6

[56] References Cited

U.S. PATENT DOCUMENTS

| 3,867,721 | 2/1975 | Saunders | 360/93 |
| 4,626,939 | 12/1986 | Takai et al. | 360/96.5 |

FOREIGN PATENT DOCUMENTS

| 52-017008 | 2/1977 | Japan | 360/96.5 |
| 58-100262 | 6/1983 | Japan | 360/96.5 |
| 58-146052 | 8/1983 | Japan | 360/96.5 |

Primary Examiner—John H. Wolff
Assistant Examiner—Matthew J. Bussan
Attorney, Agent, or Firm—Wegner & Bretschneider

[57] ABSTRACT

A cassette ejecting device for a tape recorder or a like apparatus wherein a light and easy cassette ejecting operation can be assured and a returning operation of an ejecting member can be effected assuredly without increasing the ejecting stroke. The device comprises an ejecting member which receives therein a cassette loaded in the device and slidably moves in a cassette holder, a spring receiving member pivoted by an ejecting operation of an ejecting lever, a toggle spring interconnecting the ejecting member and the spring receiving member, and a connecting means interposed between the toggle spring and the spring receiving member. As the toggle spring moves relative to the spring receiving member upon ejecting operation of the ejecting lever, immediately after the toggle spring has reached its dead center line, an end of the toggle spring is moved away from the center of the pivotal movement of the receiving member to quickly return the cassette to its initial cassette loading position.

3 Claims, 5 Drawing Sheets

CASSETTE EJECTING DEVICE FOR A TAPE RECORDER OR A LIKE APPARATUS

BACKGROUND OF THE INVENTION

1. Field of the Invention

This invention relates to a cassette ejecting device for a tape recorder or a like apparatus wherein a toggle force of a toggle spring is transmitted to a cassette holder and acts as a holding force to hold the cassette holder to a cassette operating position.

2. Description of the Prior Art

Generally, a tape recorder employing a tape cassette is constituted such that if a cassette is loaded on a cassette holder, the cassette holder is moved to a cassette operating position, and if an ejecting lever is pushed in, the cassette holder is returned to a cassette loading position.

In particular, an urging force of an urging means (a cassette holding spring) tending to move a cassette holder toward a cassette operating position is always transmitted to act upon the cassette holder by way of an interlocking member for the cassette holder. However, the cassette holder in a cassette loading position is held from movement and to the cassette loading position by a stationary member such as a chassis. Thus, if a cassette is loaded on the cassette holder, such holding by the stationary member is cancelled by such a cassette loading operation. As a result, the cassette holder is moved, for example, down, by an urging force of the cassette holding spring acting thereupon by way of the interlocking member to feed the cassette in a parallel relationship to the cassette operating position. Thus, the urging force of the cassette holding spring acts to move the cassette holder toward the cassette operating position and, after the cassette operating position is reached, acts as a holding force to hold the cassette holder to the cassette operating position.

Then, if an ejecting lever is pushed in, the cassette holder is moved toward and returns to the cassette loading position held by the stationary member, allowing ejection of the cassette. If the ejection operating force applied to the ejecting lever is removed after the cassette holder has been returned to the cassette loading position, the ejecting lever is automatically returned to its initial position by an urging force of a return spring therefor. Thus, the pushing in operation of the ejecting lever is done against the return spring and also against the urging force of the cassette holding spring acting upon the cassette holder.

It is to be noted that, in the cassette operating position, a tape within the cassette is clamped, for example, between a capstan and a pinch roller and thus runs at a fixed speed, and a magnetic head is contacted with the tape to effect desired recording on or reproduction from the tape. Further, also quick feeding or quick rewinding of the tape or temporary stopping of the tape may be done when required in the cassette operating position of the cassette holder.

In the cassette operating position, if the cassette is moved upwardly or downwardly, displacement or dislocation of a tape track relative to the magnetic head in the vertical direction will appear, making accurate recording and reproduction difficult. Accordingly, the cassette, that is, the cassette holder on which the cassette is loaded, must necessarily be held assuredly to the cassette loading position.

Again, the urging force of the cassette holding spring for the cassette holder acts also as a holding force to hold the cassette holder to the cassette loading position. Accordingly, if the urging force is increased, the cassette holder will be held more assuredly to the cassette loading position.

To the contrary, it is necessary that an ejecting operation be done lightly and readily under a low ejecting lever operating force. However, the urging force of the cassette holding spring for the cassette holder acts as a resisting force to the ejecting operation. Accordingly, if the urging force of the cassette holding force is increased, then a greater ejecting lever operating force is required and hence the ejecting operation cannot be done easily.

Thus, a cassette ejecting device is required wherein a sufficient cassette holder holding force can be obtained while an ejecting lever operating force is low, meeting such contradictory requirements as described above.

For example, a Japanese patent application No. 59-15676 discloses a cassette ejecting device wherein an urging force of a return spring for an ejecting lever and an urging force of a toggle spring both act as a cassette holder holding force in a cassette loading position.

According to the cassette ejecting device, an interlocking member for the cassette holder is mounted for pivotal motion on a chassis, and an ejecting lever is engaged with the interlocking member. Thus, a return spring for the ejecting lever provides a pivoting force to pivot the interlocking member to move a cassette holder toward its cassette operating position.

Further, a toggle spring is provided such that a toggle force thereof may be transmitted to the interlocking member by way of the ejecting lever. The ejecting member is mounted for sliding movement in the cassette holder. A pivotal spring receiving member is connected to the ejecting lever by way of a connecting rod, and the toggle spring extends between the spring receiving member and the ejecting member.

Here, as an operating member connected to an end of the toggle spring is moved, a toggle force is accumulated in the toggle spring, as well known in the art. Then, when the movable end of the toggle spring moves beyond a dead center line of the toggle spring, a toggle action appears. Thus, the accumulated toggle force is discharged instantaneously to move the operating member.

In such a construction as described above wherein the toggle spring extends between the ejecting member and the spring receiving member, the ejecting member acts as a toggle spring operating member when a cassette is loaded. Then, when the ejecting member is moved together with the loaded cassette beyond the dead center line of the toggle spring, a toggle action appears. Since the spring receiving member is connected to and hence not free from the ejecting lever, the toggle force acts also upon the ejecting member itself so that the ejecting member is absorbed into the cassette holder together with the cassette and instantaneously reaches a predetermined position. However, even after the ejecting member has reached the predetermined position, the accumulated toggle force still remains in the toggle spring. Accordingly, the ejecting member having reached the predetermined position is securely held to the predetermined position and the remaining toggle force in the toggle spring acts to tend to pivot the spring receiving member. The remaining toggle force tending to pivot the spring receiving member is transmitted to the ejecting lever by way of the connecting rod and acts in the same direction with the urging force of the return spring.

In the construction described above, the toggle force of the toggle spring is transmitted to the ejecting lever which itself causes the interlocking member to produce a pivoting force to move the cassette holder toward the cassette operating position, as described hereinabove. Accordingly, in addition to the urging force of the return spring, the toggle force of the toggle spring is transmitted to act upon the cassette holder by way of the interlocking member. In this manner, the cassette holder is acted upon not only by the urging force of the cassette holding spring for the cassette holder but also by the urging force of the return spring and the toggle force of the toggle spring. Accordingly, even if the cassette holding spring for the cassette holder is designed to have a low spring force, a sufficient holding force acts upon the cassette holder in the cassette operating position, allowing assured holding of the cassette holder. Thus, since the urging force of the cassette holding spring which acts as a resisting force upon ejecting operation can be reduced, the ejecting lever operating force can be reduced, allowing lighter and easier ejecting operation.

In ejecting operation, if the ejecting lever is pushed in sufficiently, the cassette holder is returned to the cassette loading position and the ejecting member is returned to its initial position with the cassette held thereon. Thus, the cassette is partly projected from the cassette ejecting device, allowing ejection thereof. Here, if the returning action of the cassette holding member does not occur, ejection of the cassette becomes difficult.

By the way, in the arrangement of Japanese patent application No. 59-15676 described above, the returning operation of the cassette holding member is caused by the urging force of the toggle spring. Here, if the toggle force is accumulated sufficiently in the toggle spring, a high toggle force will be produced, assuring the returning operation of the cassette. Thus, if the stroke of the ejecting lever is increased, then the spring receiving member will pivot a sufficient amount, deforming the toggle spring to a sufficient degree, and hence a high toggle force will be accumulated in the toggle force. However, if the ejecting stroke is increased, the operability is deteriorated instead and a higher ejection operating force becomes necessary, which makes light and easy ejecting operation difficult. Besides, this will increase an overall size of the cassette ejecting device. Accordingly, such increase of the ejecting stroke is not preferable.

SUMMARY OF THE INVENTION

It is an object of the present invention to provide a cassette ejecting device for a tape recorder or a like apparatus wherein a light and easy cassette ejecting operation is assured and a returning operation of an ejecting member can be effected assuredly without increasing the ejecting stroke.

In order to attain the object, according to the present invention, there is provided a cassette ejecting device for a tape recorder or a like apparatus wherein, in response to a loading operation of a cassette, a cassette holder held to a cassette loading position by an interlocking member is released from holding by said interlocking member and is moved up or down to transport the cassette to its operating position, and in response to an ejecting operation of an ejecting lever, said cassette holder is returned to its cassette loading position held by said interlocking member to eject the cassette, said cassette ejecting device comprising an ejecting member mounted for sliding movement in said cassette holder with a loaded cassette received thereon, a spring receiving member mounted for pivoting movement in an interlocking relationship with an ejecting operation of said ejecting lever, a toggle spring interconnecting said ejecting member and said spring receiving member, and a connecting means interposed between said toggle spring and said spring receiving member for moving an end of said toggle spring away from the center of the pivotal movement of said receiving member after said toggle spring has reached its dead center line as said spring receiving member and said toggle spring move relative to each other upon ejecting operation of said ejecting lever.

Accordingly, in the cassette ejecting device according to the invention, the toggle force of the toggle spring varies around the center of the pivotal motion of the spring receiving member in accordance with a principle of a lever. In particular, at a point of time when an ejecting stroke is started, the length of a lever with respect to the end of the toggle spring is in the minimum and hence the toggle force transmitted from the toggle spring to the ejecting lever is in the minimum. Consequently, the resistance originating in the toggle force is in the minimum, the hence a light and easy ejecting operation is assured. Meanwhile, as the end of the torque spring moves beyond the dead center line of the toggle spring in the latter half of the ejecting stroke, it is moved away from the center of the pivotal motion of the spring receiving member, deforming the toggle spring sufficiently. Accordingly, a toggle action can be caused under the sufficiently deformed toggle spring, and hence a returning operation of the ejecting member can be effected assuredly.

The above and other objects, features and advantages of the present invention will become apparent from the following description and the appended claims, taken in conjunction with the accompanying drawing.

DESCRIPTION OF THE PREFERRED EMBODIMENTS

Now, a preferred emboidiment of the present invention will be described in detail with reference to the accompanying drawing.

Figure 1:
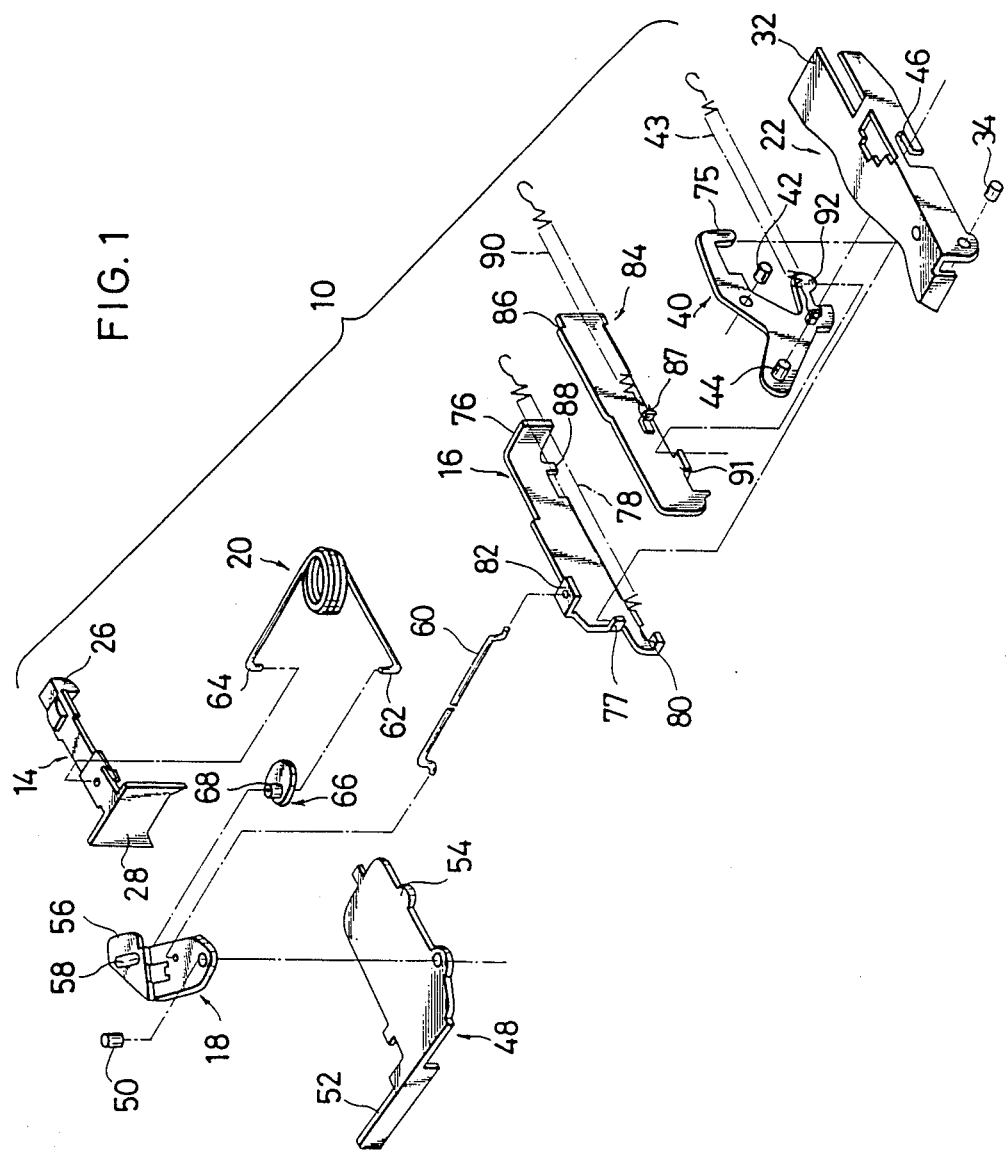
FIG. 1 is a cassette ejecting device according to the present invention which is incorporated in a tape recorder in which a tape cassette is used.
Figure 2:
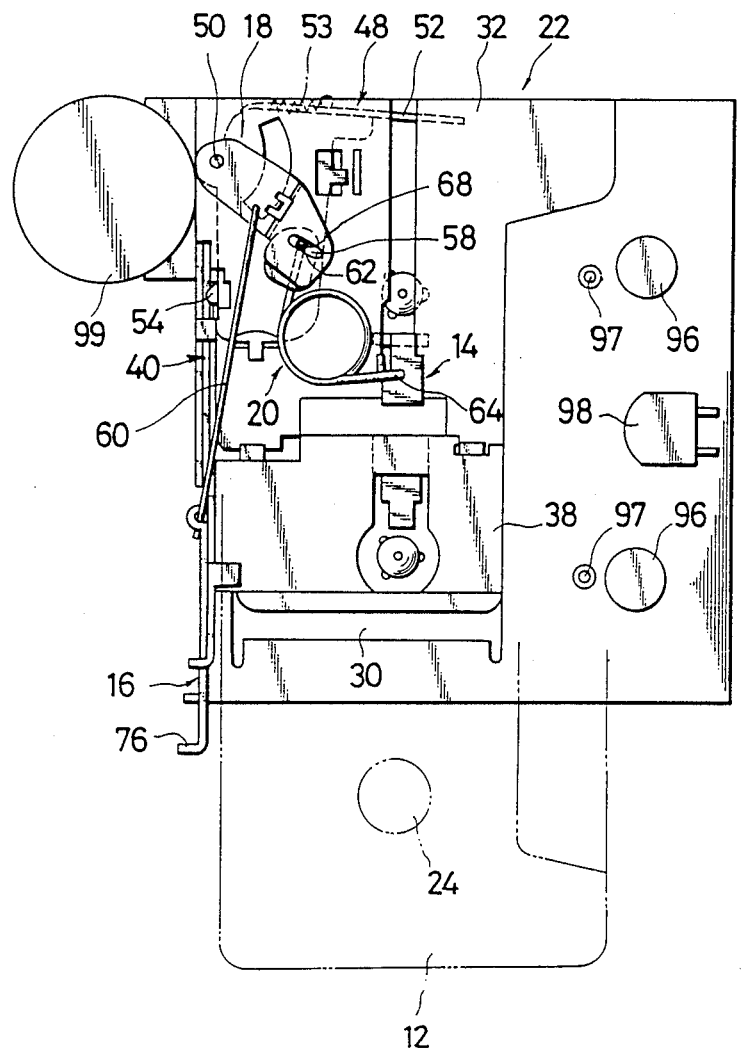
FIGS. 2 and 3 are a plan view and a front elevational view, respectively, of a tape recorder in a cassette loading position.
Figure 3:
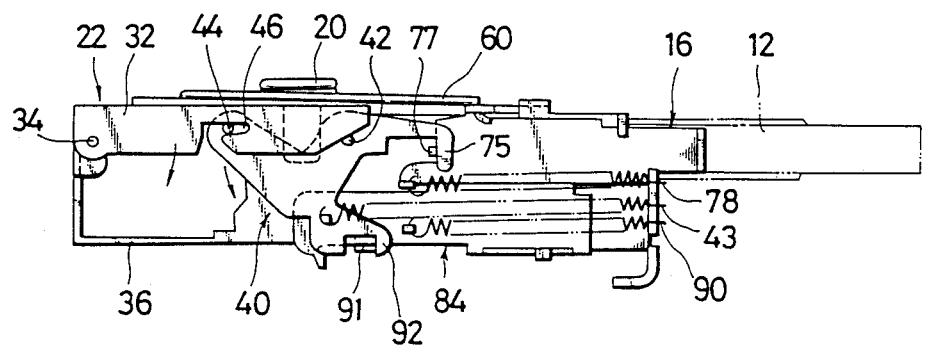

Referring first to FIGS. 1 to 3, a cassette ejecting device 10 according to the present invention includes a slidable ejecting member 14 for latching a tape cassette 12, and a spring receiving member 18 connected to be pivoted in response to an ejecting operation of an ejecting lever 16. A toggle spring 20 extends between the ejecting member 14 and the spring receiving member 18.

The ejecting member 14 is molded, for example, from a synthetic resin material and has at an outer end thereof a latching piece 26 adapted to engage in a leftside one of a pair of reel holes 24 formed in a tape cassette and at an inner end thereof an engaging piece 28 located for engagement by an end of a tape cassette. Thus, as a cassette 12 is loaded, the latching piece 26 is engaged with the left reel hole 24 while an end of the cassette 12 is engaged by the engaging piece 28 of the ejecting member 14 to assure integral sliding movement of the cassette 12 and the cassette ejecting member 14.

It is to be noted that a cassette holder 22 employed here may be of a known type and detailed description thereof will be omitted herein. However, it is to be described here that the cassette holder 22 has a downwardly open cassette receiving opening 30 (refer to FIG. 2) formed therein and includes a pivotal cassette holder member 32 mounted for pivotal motion on a side wall of a chassis 36 of a tape recorder by means of a pair of pins 34. A cassette holder body 38 is mounted on a free end of the cassette holder 22 such that as the cassette holder 22 is pivoted in a clockwise direction in FIG. 3, the cassette holder body 38 may be moved in parallel without being slanted to assure parallel movement of the cassette 12.

The cassette holder 22 is normally held to a cassette loading position as shown in FIGS. 2 and 3 by means of an interlocking member 40. The interlocking member 40 is mounted for pivotal motion on a side wall of the chassis 36 by means of a pin 42. A cassette holding spring 43 consisting of a tension spring extends between the interlocking member 40 and the chassis 36 and provides a pivoting force to urge the interlocking member 40 in a counterclockwise direction around the pin 42 in FIG. 3. Such pivotal motion of the interlocking member 40 is stopped by a lower face of an engaging member abutting with an upper edge of the interlocking member 40 as described hereinbelow. An engaging pin 44 is implanted on a side surface of the interlocking member 40 and extends therefrom so as to engage with an elongated engaging hole 46 formed in a side wall of the cassette holder 22.

As described above, the interlocking member 40 is acted upon by a pivoting force in the counterclockwise direction caused by an urging force of the tension spring 43. The pivoting force is transmitted to the cassette holder 22 via the engaging pin 44 and the engaging hole 46 and thus urges the cassette holder 22 to pivot in the clockwise direction around the pin 34 as seen from FIG. 3.

An engaging member 48 is mounted for pivotal motion in the cassette holder 22 by means of a pin 50. The engaging member 48 has at an end thereof an abutting piece 52 which is located in a path of the ejecting member 14 as shown in FIG. 2 so that it may be abutted by the ejecting member 14. The engaging member 48 has an abutting nose 54 at another end thereof, and a tension spring 53 extends between the chassis 36 and the engaging member 48 to urge the engaging member 48 in a clockwise direction around the pin 50. The pivotal motion of the engaging member 48 in the clockwise direction is stopped by a side wall of the chassis 36 abutting with the abutting nose 54 of the engaging member 48. In a position of the abutting nose 54 of the engaging member 48 abutting with the side wall of the chassis 36, the abutting nose 54 is positioned above the interlocking member 40. Accordingly, the upper edge of the interlocking member 40 abuts with a lower surface of the abutting nose 54 of the engaging member 48 to restrict pivotal motion of the interlocking member 40.

The spring receiving member 18 is mounted for pivotal motion on the cassette holder 22 by means of the pin 50 commonly to the engaging member 48. The spring receiving member 18 has at an end thereof an upwardly offset portion 56 by which a shoulder is formed on a rear surface of the spring receiving member 18. The spring receiving member 18 has an elongated guide hole 58 formed therein and extending in a direction toward and away from the center of pivotal motion (the pin 50) of the spring receiving member 48. A connecting rod 60 extends between and interconnects the spring receiving member 18 and the ejecting lever 16 to establish an interlocking relationship therebetween. On the other hand, the spring receiving member 18 is connected also to the ejecting member 14 by way of the toggle spring 20. In other words, the toggle spring 20 extends between the ejecting member 14 and the spring member 18.

According to the present invention, an end 62 of the toggle spring 20 is connected not directly but indirectly to the spring receiving member 18 by way of a connecting means 66. The other end 64 of the toggle spring 20 is connected directly to the ejecting member 14.

Figure 6:
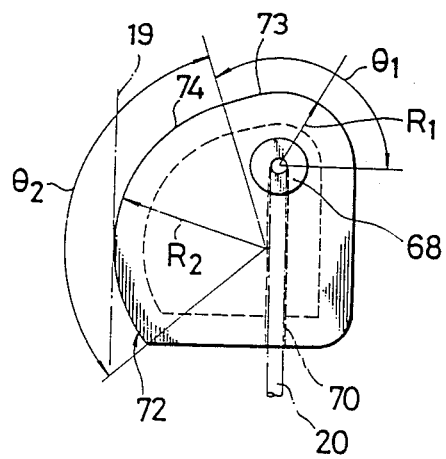
FIGS. 6 and 7 are a plan view and a front elevational view, respectively, in an enlarged scaled, of a cam member.
Figure 7:
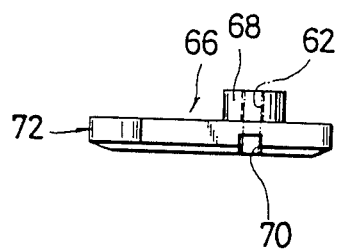

As apparently seen from FIGS. 1, 6 and 7, in the embodiment shown, the connecting means 66 is in the form of a cam member and has on an upper surface thereof a guide pin 68 adapted for fitting engagement with the end 62 of the toggle spring 20. The cam member 66 has an engaging groove 70 formed in a lower surface thereof. Thus, the end 62 of the toggle spring 20 is fitted in and connected to the guide pin 68 of the cam member 66 while a portion of the toggle spring 20 is fitted in the engaging groove 70 of the cam member 66. In such a construction, the connecting means 66 will be pivoted around the guide pin 68 in response to deformation of the toggle spring 20 appearing at the end 62 thereof. Here, the connecting means 66 has on a circumferential surface thereof a cam face 72 which includes a first cam face portion 73 extending over a range denoted at $\theta 1$ and having a radius R1 and a second contiguous cam face portion 74 extending over a contiguous range $\theta 2$ and having a radius R2 (here, R2>R1). The cam face portions 72, 73 are adapted to engage with the shoulder 19 formed on the rear surface of the spring receiving member 18 under the urging force of the toggle spring 20. Accordingly, the guide pin 68 of the connecting member 66 will slide together with the end 62 of the toggle spring 20 in and along the guide hole 58 of the spring receiving member 18 in response to deformation of the toggle spring 20. It is to be noted that the connecting means 66 is not limited to such a cam member as described above and can naturally be made in various forms. Further, while the shoulder 19 is formed by bending the spring receiving member 18, it may be replaced, for example, by an abutting piece which is formed to extend from the spring receiving member 18 so that it may abut with the connecting member 66.

The ejecting lever 16 has a bent lug 76 transversely bent substantially at a right angle at an end thereof so that a force for ejecting operation may be received by the bent lug 76. The ejecting lever 16 has another bent lug 77 formed at the other end thereof for abutting engagement with an abutting extension 75 of the interlocking member 40. The ejecting lever 16 further has a laterally bent hook 80 formed on a lower edge adjacent the other end thereof, and a return spring 78 is hooked at an end thereof to the hook 80 of the ejecting lever 16 and extends between the chassis 36 and the ejecting lever 16. In the embodiment shown, the return spring 78 is composed of a tension spring but is not limited to this naturally. An end of the connecting rod 60 extending between the spring receiving member 18 and the ejecting lever 16 is hooked to another laterally bent hook 82 formed at an upper end of the ejecting lever 16. Accordingly, as the ejecting lever 16 is pushed in against the return spring 78, the spring receiving member 18 is pushed by the connecting rod 60. In this instance, the spring receiving member 18 is acted upon by a pivoting force tending to pivot the spring receiving member 18 in the counterclockwise direction around the pin 50 in FIG. 1.

An operating force transmitting member 84 is mounted for interlocking movement with the ejecting lever 16. The operating force transmitting member 84 has on an upper edge thereof a connecting shoulder 86 located in a path of a projection 88 formed on a lower edge of the ejecting lever 16. A return spring 90 composed, for example, of a tension spring, extends between a laterally bent lug 87 of the operating force transmitting member 84 and the chassis 36. Thus, as the ejecting lever 16 is pushed in against the urging force of the return spring 78, the projection 88 of the ejecting lever 16 will be abutted with the connecting shoulder 86 of the operating force transmitting member 84 sooner or later. Consequently, the operating force transmitting member 84 will be moved in an interlocking relationship with the ejecting lever 16 against the urging force of the return spring 90. The operating force transmitting member 84 further has a laterally bent lug 91 formed thereon and located to abut with an engaging piece 92 of the interlocking member 40 under the urging force of the return spring 90 thereby to control the position of the operating force transmitting member 84.

In the construction described above, loading and ejecting operations of a cassette will be conducted as follows.

In a position of FIGS. 2 and 3 in which the cassette holder 22 is in its cassette loading position, a cassette 2 will be put into the cassette receiving opening 30 and pushed into the machine. Thus, the latching piece 26 of the ejecting member 14 is latched into one of the reel holes of the cassette 12 while a leading end of the cassette 12 is abutted with the abutting piece 28 of the ejecting member 14. Accordingly, the cassette 12 is moved in an integral relationship with the ejecting member 14 into the cassette holder 22.

As the ejecting member 14 is moved together with the cassette 12, the end 64 of the toggle spring 20 is deformed to gradually accumulate a toggle force in the toggle spring 20. Thus, after the ejecting member 14 has been moved together with the cassette 12 until the end 64 of the toggle spring 20 reaches a neutral point or dead center line of the toggle spring 20, the ejecting member 14 and the cassette 12 are quickly absorbed into the cassette holder 22 by a toggle action of the toggle spring 20. Consequently, the abutting piece 28 of the ejecting member 14 is abutted with the abutting piece 52 of the engaging member 48 and pivots the engaging member 48 in the counterclockwise direction around the pin 50 against the urging force of the tension spring 53. As the engaging member 48 is pivoted in this manner, the abutting nose 54 of the engaging member 48 is moved away from the chassis 36 and away from above the interlocking member 40. Here, the interlocking member 40 is subject to a pivoting force in the counterclockwise direction around the pin 42 caused by the urging force of the cassette holding spring 43. Consequently, due to the removal of the abutting nose 54 of the engaging member 48, the interlocking member 40 is permitted to pivot in the counterclockwise direction and as a result, the pivotal cassette holder member 32 is pivoted in the clockwise direction around the pin 34 due to engagement of the engaging pin 44 of the interlocking member 40 with the engaging hole 46 of the pivotal cassette holder member 32. As a result, the cassette holder body 38 is moved downwardly in a parallel relationship without being slanted and the cassette 12 within the cassette holder 22 is brought to a cassette operating position.

In the cassette operating position, naturally a predetermined operation such as recording on or reproduction from a tape is conducted using a pair of sets of pinch rollers 96 and capstans 97, a recording and reproducing head 98, a motor 99 and so on.

Figure 4:
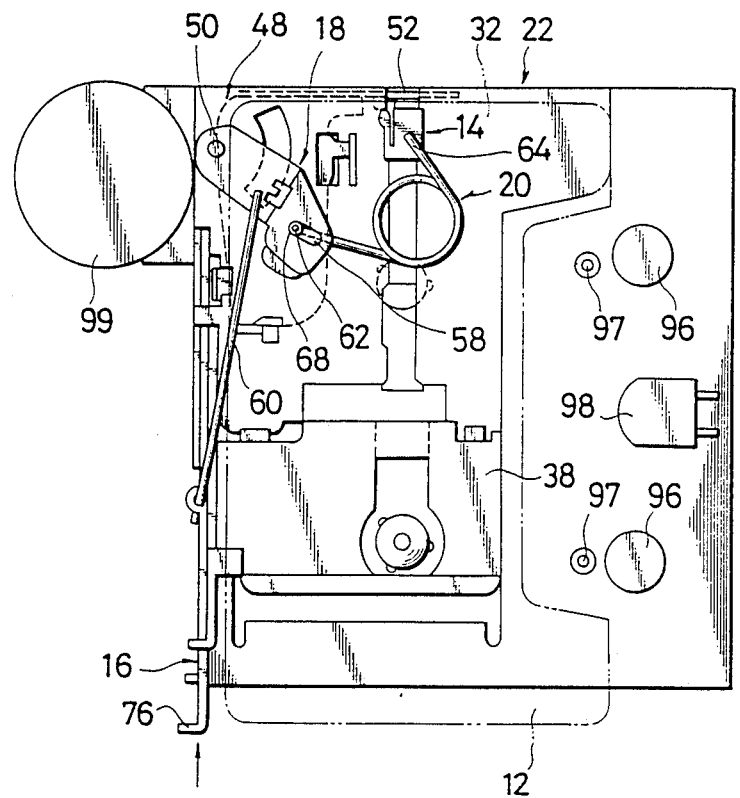
FIGS. 4 and 5 are a plan view and a front elevational view, respectively, of the tape recorder in a cassette operating position.
Figure 5:
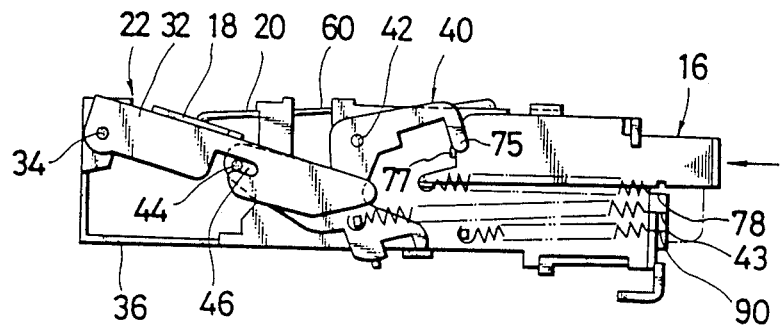

As is apparent from FIGS. 4 and 5, in the cassette operating position, naturally the cassette holding spring 43 urges, via the interlocking member 40, the cassette holder 32 downwardly to surely hold it to the cassette operating position.

Meanwhile, since the bent lug 77 of the ejecting lever 16 is engaged with the abutting extension 75 of the interlocking member 40, the return spring 78 for the ejecting lever 16 urges the interlocking member 40 to pivot around the pin 42 to urge the cassette holder 32 downwardly. In other words, also the urging force of the return spring 78 acts as a holding force to hold the cassette holder 32 to the cassette operating position.

Figure 8:
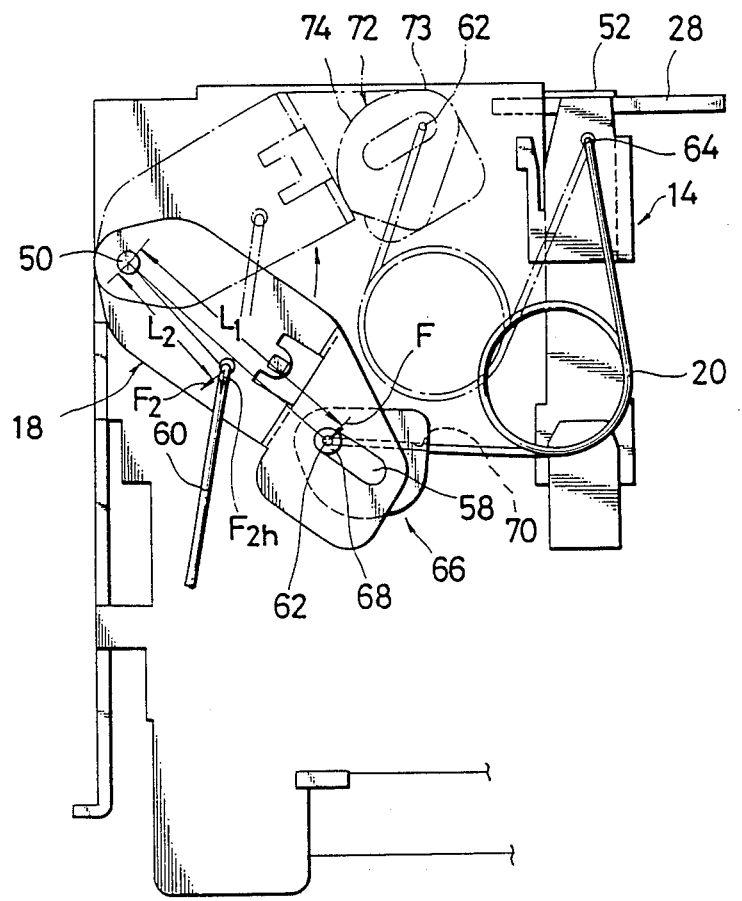
FIG. 8 is a partial plan view, in a somewhat enlarged scale, of the cassette ejecting device, illustrating deformation of a toggle spring upon ejecting operation.

Further, even after the ejecting member 14 has abutted with and moved the abutting piece 52 of the engaging member 48 to a predetermined position, a toggle force remains in the toggle spring 20 and acts to open the toggle spring 20. Accordingly, as is apparent from FIG. 8, the guide pin 68 in which the end 62 of the toggle spring 20 is fitted is guided by the guide hole 58 of the spring receiving member 18 and pressed against an end of the guide hole 58 nearer to the pin 50, that is, a left-hand side end of the guide hole 58. Here, it is assumed that the distance from the pin 50 to the end 62 of the toggle spring 20 is represented at L1 and the distance from the pin 50 to an end of the connecting rod 60 hooked to the spring receiving member 18 is represented at L2. Further, the vertical component of a toggle force acting on the end 62 of the toggle spring 20 is represented at F1. Thus, a force $F1*L1/L2=F2$ appears at the end of the connecting rod 60 around the pin 50, and a horizontal component F2h of the force F2 is transmitted to the connecting rod 60. This force is transmitted to the ejecting lever 16 via the connecting rod 60 and urges the cassette holder 32 downwardly to hold the cassette holder 32 to the cassette operating position.

Thus, in addition to the cassette holding spring 43, the return spring 78 for the ejecting lever 16 and the toggle spring 20 yield a cassette holder holding force sufficient to hold the cassette holder 32 to the cassette operating position. Accordingly, the cassette holder 32 is surely held to the cassette operating position, thereby assuring accurate recording and reproducing operation of the system. Further, in the construction described above, the cassette holding spring 43 can be a spring of a reduced spring force and hence the resistance to an ejecting operation can be reduced so that an ejecting operation may be done lightly and readily under a low ejection operating force.

It is to be noted that the position of the end 62 of the toggle spring 20 when it is pressed against the left end of the guide hole 58 of the spring receiving member 18 together with the guide pin 68 of the cam member 66 substantially corresponds to a position of a toggle spring in a known arrangement. Accordingly, also in the arrangement of the present invention, a cassette holder holding force substantially equal to that obtained in such a known arrangement can be provided by the toggle force of the toggle spring 20.

An ejecting operation is activated by pushing the ejecting lever 16 in. In particular, referring to FIGS. 4 and 5, if the ejecting lever 16 is pushed in, a pivoting force to pivot the cassette holder 22 in the counterclockwise direction around the pin 34 appears in the cassette holder 22. The pivoting force will lift the cassette holder 22 to the cassette loading position against the urging force of the cassette holding spring 43.

The ejecting lever 16 is pushed in not only against the ejecting spring 78 and the cassette holding spring 43 but also against the toggle spring 20. However, the force F2h acting on the ejecting lever 16 via the connecting rod 60 in the cassette operating position as described hereinabove is proportional to the distance L1 between the end 62 of the toggle spring 20 and the pin 50. Here, the end 62 of the toggle spring 20 is positioned at the left end of the guide hole 58 of the spring receiving member 18 and L1 assumes its minimum value. Consequently, also F2h assumes its minimum value here. Accordingly, an ejecting operation can be done while the influence of the toggle spring 20 is in the minimum, and hence a light and ready ejecting operation is further assured.

As the ejecting lever 16 is being pushed in, the spring receiving member 18 is pushed by the connecting rod 60 and pivoted in the counterclockwise direction around the pin 50. As the spring receiving member 18 is pivoted in this manner, the end 62 of the toggle spring 20 is moved toward the other end 64, deforming the toggle spring 20. Since part of the toggle spring 20 is received in the engaging groove 70 of the cam member 66 as shown in FIG. 6, as the end 62 of the toggle spring 20 moves, the cam member 66 is turned in the clockwise direction around the end 62 of the toggle spring 20 so that the cam face 72 thereof will be soon pressed by the shoulder 19 on the rear surface of the spring receiving member 18. Then, in the latter half of the ejecting stroke, the cam face portion 74 of the cam face 72 is engaged with the shoulder 19 so that the cam member 66 is pushed to move away from the shoulder 19. Accordingly, after passing the dead center line of the toggle spring 20, the guide pin 68 is slidably moved away from the pin 50 within the guide hole 58. In the latter half of the ejecting stroke, the guide pin 68 will reach the right end of the guide hole 58 most remote from the pin 50 as shown in phantom in FIG. 8. In this position, the end 62 of the toggle spring 20 comes nearest to the other end 64 of the toggle spring 20, presenting deformation of the toggle spring 20 to a maximum degree with a maximum toggle force accumulated in the toggle spring 20.

Then, directly after the ejecting lever 16 has come to the final position, a toggle action appears. Consequently, the toggle force sufficiently accumulated in the toggle spring 20 will act upon the ejecting member 14 so that the ejecting member 14 will be instantaneously returned to its initial position ready for accepting a new cassette as shown in FIG. 1.

In this manner, according to the present invention, since a toggle action acts upon the ejecting member when a maximim toggle force is accumulated, the ejecting member can be returned assuredly to its initial position. With the construction, there is no necessity of increasing the ejecting stroke, and hence the operability will not be deteriorated. Besides, no increase of the size of the cassette ejecting device 10 will be resulted.

It is to be noted that while in the embodiment the cassette ejecting device 10 is applied to a tape recorder employing a tape cassette, the application of it is not limited to this. In other words, indeed the present invention is best applied for a tape recorder, a VTR (video tape recorder) and some other appliances employing a cassette, but the application of the present invention is not limited to such appliances. Besides, the mechanism which makes use of a toggle spring can itself be applied as such over a wide variety of applications.

It will be appreciated that the embodiment specifically shown in the drawing and described hereinabove in detail is illustrative only and that any changes and modifications can be made within the spirit and scope of the invention. For example, while in the embodiment the end 62 of the toggle spring 20 is moved together with the connecting means 66 along the spring receiving member 18 by the abutting engagement of the cam face 72 of the cam member 66 with the shoulder 19 of the spring receiving member 18, means for attaining such movement of the end 62 of the toggle spring 20 is not limited to this, and any other combinations may be employed for such means.

As apparent from the foregoing description, according to the present invention, a toggle force of a toggle spring is utilized also as a holding force for a cassette holder. Accordingly, a cassette holding spring can be of a low spring force. Since an ejecting operation is performed against the cassette holding spring, it can be done lightly and easily.

While the toggle force of the toggle spring acts as a resisting force to an ejecting position, since an injecting stroke is started when the resisting force of the toggle spring is in the minimum, a light and easy ejecting operation is still assured. Meanwhile, the toggle force accumulated in the toggle spring increases as the ejecting stroke proceeds, and a toggle action acts upon an ejecting member when the toggle force is in the maximum. Accordingly, the returning operation of the ejecting member to its initial position can be effected assuredly.

It is to be noted that where a connecting position between the toggle spring and the spring receiving member upon starting of an ejecting stroke is selected to substantially coincide with a fixed connecting position in a known arrangement, the toggle force acting as a cassette holder holding force can be maintained to a similar level as in a conventional arrangement.

What is claimed is:

1. A cassette ejecting device for ejecting a cassette from a tape recorder or similar apparatus, comprising:
   a cassette holder having an opening therein, the cassette being loaded through said opening in a cassette-inserting direction and being ejected through said opening in a cassette-ejecting direction;

a spring-receiving member mounted pivotally on said cassette holder and being pivotable about an axis within a predetermined first range;

an ejecting lever which is coupled to said spring-receiving member;

an ejecting member mounted on the cassette holder for engaging the cassette, said ejecting member being movable with the cassette in a predetermined second range in the cassette-inserting and cassette-ejecting directions; and a toggle spring having a first end thereof coupled to said ejecting member and a second end thereof coupled to said spring-receiving member;

insertion of the cassette into said cassette holder causing the ejecting member to move with the cassette, thereby causing the toggle spring to undergo an elastic deformation to a maximum displacement, beyond which point the ejecting member draws the cassette into the cassette holder under an elastic return force of the toggle spring, bringing the cassette to a pre-determined operating position within the cassette holder; and depression of said ejecting lever causing said spring-receiving member to pivot about the axis, thereby causing the toggle spring to undergo an elastic deformation to a maximum displacement, beyond which point the ejecting member ejects the cassette from the cassette holder under an elastic return force of the toggle spring;

wherein said spring-receiving member comprises a cam-receiving surface and a slot which extends essentially radially from the axis of said spring-receiving member, and said toggle spring comprises a cam connected to the second end thereof, said cam contacting said cam-receiving surface and guiding the second end of said toggle spring within the slot so that when the cassette is inserted into said cassette holder, the cam-receiving surface interacts with the cam so as to move the second end of said toggle spring toward an end of the slot closest to the axis, thereby decreasing the maximum elastic deformation of said toggle spring, but when said ejection lever is pressed to cause said spring-receiving member to rotate, the cam-receiving surface interacts with the cam so as to move the second end of said toggle spring within the slot in a direction away from the axis, thereby increasing the maximum elastic deformation of the toggle spring.

2. The cassette ejecting device as claimed in claim 1, wherein said cam comprises an engaging groove and a guide pin, said guide pin fitting in the slot and having an opening therein for receiving the second end of said toggle spring, said engaging groove engaging a portion of said toggle spring so as to prevent the second end of the toggle spring from rotating with respect to the cam.

3. The cassette ejecting device as claimed in claim 1, wherein said cam-receiving surface is a shoulder formed on one surface of said spring-receiving member.

* * * * *